(12) United States Patent
Schrader (10) Patent No.: US 7,631,919 B2
(45) Date of Patent: Dec. 15, 2009

(54) INTEGRATED BED SEPARATOR AND TRUNK LID

(75) Inventor: Michael A. Schrader, Plain City, OH (US)

(73) Assignee: Honda Motor Co., Ltd., Tokyo (JP)

( * ) Notice: Subject to any disclaimer, the term of this patent is extended or adjusted under 35 U.S.C. 154(b) by 84 days.

(21) Appl. No.: 11/877,663

(22) Filed: Oct. 23, 2007

(65) Prior Publication Data
US 2009/0102219 A1  Apr. 23, 2009

(51) Int. Cl.
*B60R 9/06* (2006.01)
(52) U.S. Cl. .................... 296/37.6; 296/37.14
(58) Field of Classification Search ............ 296/37.6, 296/37.14, 37.16, 37.1, 39.3
See application file for complete search history.

(56) References Cited
U.S. PATENT DOCUMENTS

| | | | |
|---|---|---|---|
| 4,749,226 A | 6/1988 | Heft | |
| 4,875,730 A | 10/1989 | Justice | |
| 5,743,589 A | 4/1998 | Felker | |
| 6,267,427 B1 | 7/2001 | Ziehl | |
| 6,290,277 B1 * | 9/2001 | Spykerman et al. | 296/24.43 |
| 6,883,851 B2 | 4/2005 | McClure et al. | |
| 7,097,224 B2 | 8/2006 | Lester et al. | |

* cited by examiner

*Primary Examiner*—Joseph D Pape
(74) *Attorney, Agent, or Firm*—Mark E. Duell; Rankin, Hill & Clark LLP (57) ABSTRACT

A vehicle body for a vehicle having a load-carrying bed includes a bed floor, a trunk, a trunk lid, and a bed divider. The bed floor defines a load bearing surface of the load-carrying bed. The trunk is found below the bed floor. The trunk lid connects to the bed floor and covers the trunk. The bed divider connects to the bed floor and covers the trunk lid. The bed divider and the trunk lid are movable as a unit to provide access to the trunk.

21 Claims, 10 Drawing Sheets

FIG. 10

# INTEGRATED BED SEPARATOR AND TRUNK LID

BACKGROUND OF THE INVENTION

Vehicles having load carrying beds, e.g. pickup trucks, are used to transport cargo. The load carrying bed of a pickup truck is typically open to the atmosphere. This can make the bed unsuitable for transporting cargo that is prone to being stolen or that can be damaged by environmental elements. Because of this, compartments underneath the floor of the load carrying bed, along with other devices such as truck caps, have been provided for vehicles having load carrying beds. Compartments underneath the bed floor have been found to be particularly desirable because the hidden bed compartment does not reduce the storage spaced or impede the accessibility to the bed.

A typical hidden bed compartment is covered by a lid having an upper surface that is flush with the upper surface floor of the load carrying bed. Because of this, when cargo such as lumber, rocks, mulch and other items are placed into the load-carrying bed, the cargo can also be located atop the lid that covers the hidden bed compartment. If the load carrying bed is being used to transport cargo and the cargo covers the lid, then the hidden bed compartment is inaccessible until the cargo is removed from atop the lid.

A bed divider is used in conventional pickup trucks to retain cargo in a specified area in the load carrying bed. A bed divider, therefore, can be useful in inhibiting cargo from moving from one region of the bed to atop the hidden bed compartment lid. Known bed separators, however, can be bulky and awkward, as well as being difficult to remove when not being used to separate cargo in the load carrying bed.

SUMMARY OF THE INVENTION

A vehicle body for a vehicle having a load-carrying bed that overcomes the shortcomings mentioned above includes a bed floor, a trunk, a pivoting trunk lid, and a pivoting bed divider. The bed floor defines a load bearing surface of the load-carrying bed. The trunk is found below the bed floor. The pivoting trunk lid connects to the bed floor and covers the trunk. The pivoting bed divider connects to the bed floor and covers the trunk lid. The bed divider and the trunk lid are movable as a unit to provide access to the trunk.

A vehicle body that overcomes the shortcomings mentioned above can also include a load carrying bed defined by left and right side members and a bed floor. The body further includes a hidden bed trunk disposed below the floor and a unit connected to the bed floor and covering the trunk. The unit selectively connects with the side members to divide the bed and selectively covers the trunk.

In addition, a vehicle body that overcomes the shortcomings discussed above can include a left side member, a right side member, a bed floor extending between the left side member and the right side member, a trunk disposed below the floor, a bed divider movable between a closed position and a bed-dividing position, and a trunk lid disposed below the bed divider. The left side member, the right side member and the bed floor generally define a load-carrying bed. When the bed divider is in a closed position, the bed divider covers the trunk. When the bed divider is in the bed-dividing position, the bed divider divides the bed into at least two cargo carrying areas. The trunk lid is movable between a closed position where the trunk lid covers the trunk and an open position where the trunk lid is moved away to provide access to the trunk.

DETAILED DESCRIPTION

Figure 1:
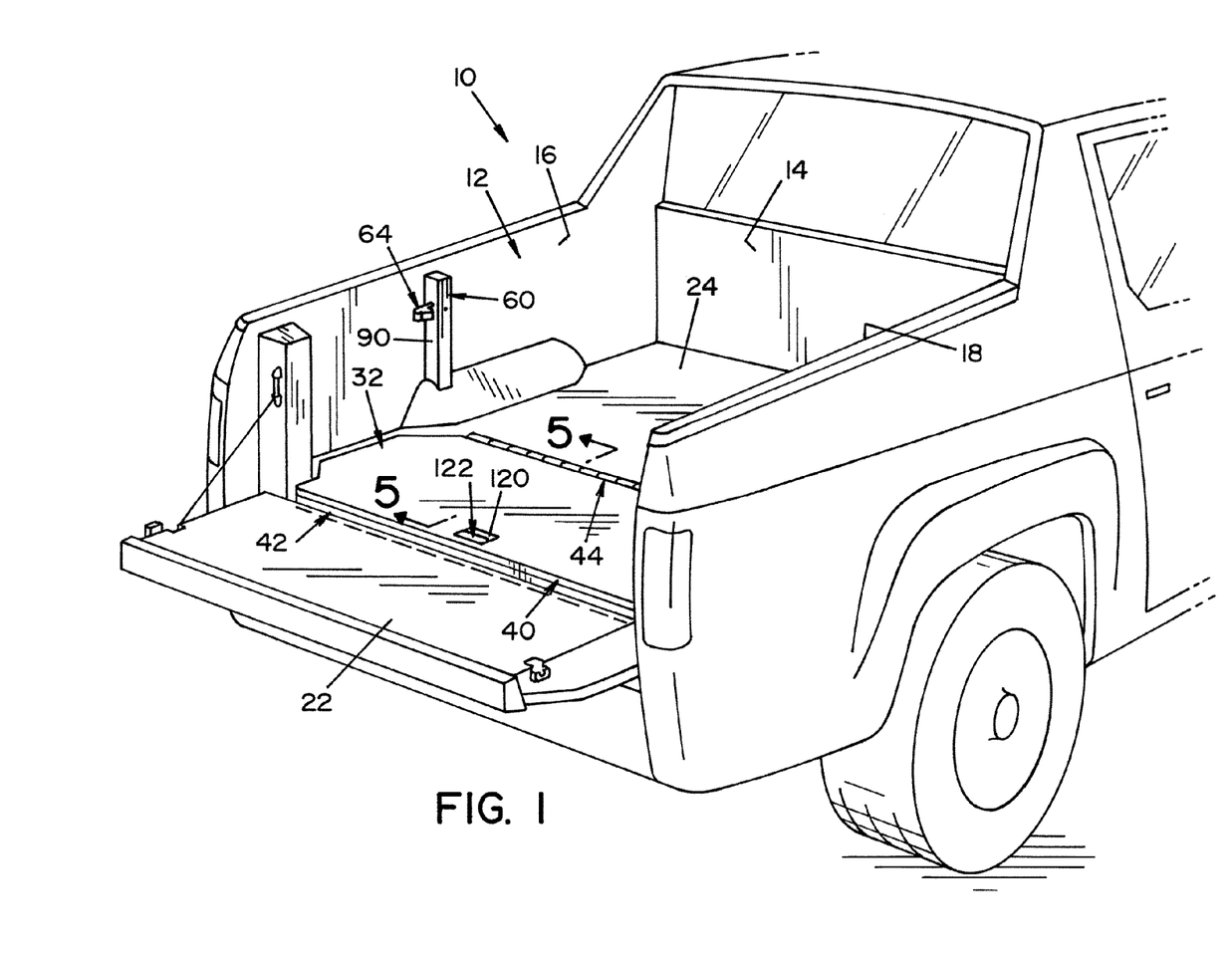
FIG. 1 is a perspective view of the rear of a vehicle having a load carrying bed and a hidden trunk. A unit that covers the trunk is shown in a first operating position.

With reference to FIG. 1, a vehicle body 10 for a vehicle having a load-carrying bed 12 is shown from the rear. The vehicle that is depicted is known in the art as a pickup truck; however, other vehicles having load carrying beds are also contemplated and can include the components that will be described with more detail below. The load-carrying bed 12 is useful to transport cargo such as lumber, gravel, mulch and other items. Unless the bed 12 is covered by a truck cap or similar device, the bed is open to the atmosphere.

The load carrying bed 12 is generally defined by a head board member 14, a left side member 16 and a right side member 18 that both extend rearwardly from the headboard member, and a tailgate 22 at the rear. The load-carrying bed 12 is also defined by a generally horizontal bed floor 24 that spans from the left side member 16 to the right side member 18 and from the headboard member 14 to the tailgate 22. Similar to known tailgates, the tailgate 22 moves between an open position, which is shown in FIG. 1, and a locked and closed position, which is not shown in the figures. The headboard member 14, left side member 16 and the right side member 18 extend upwardly from the bed floor 24 and are generally vertically oriented.

Figure 2:
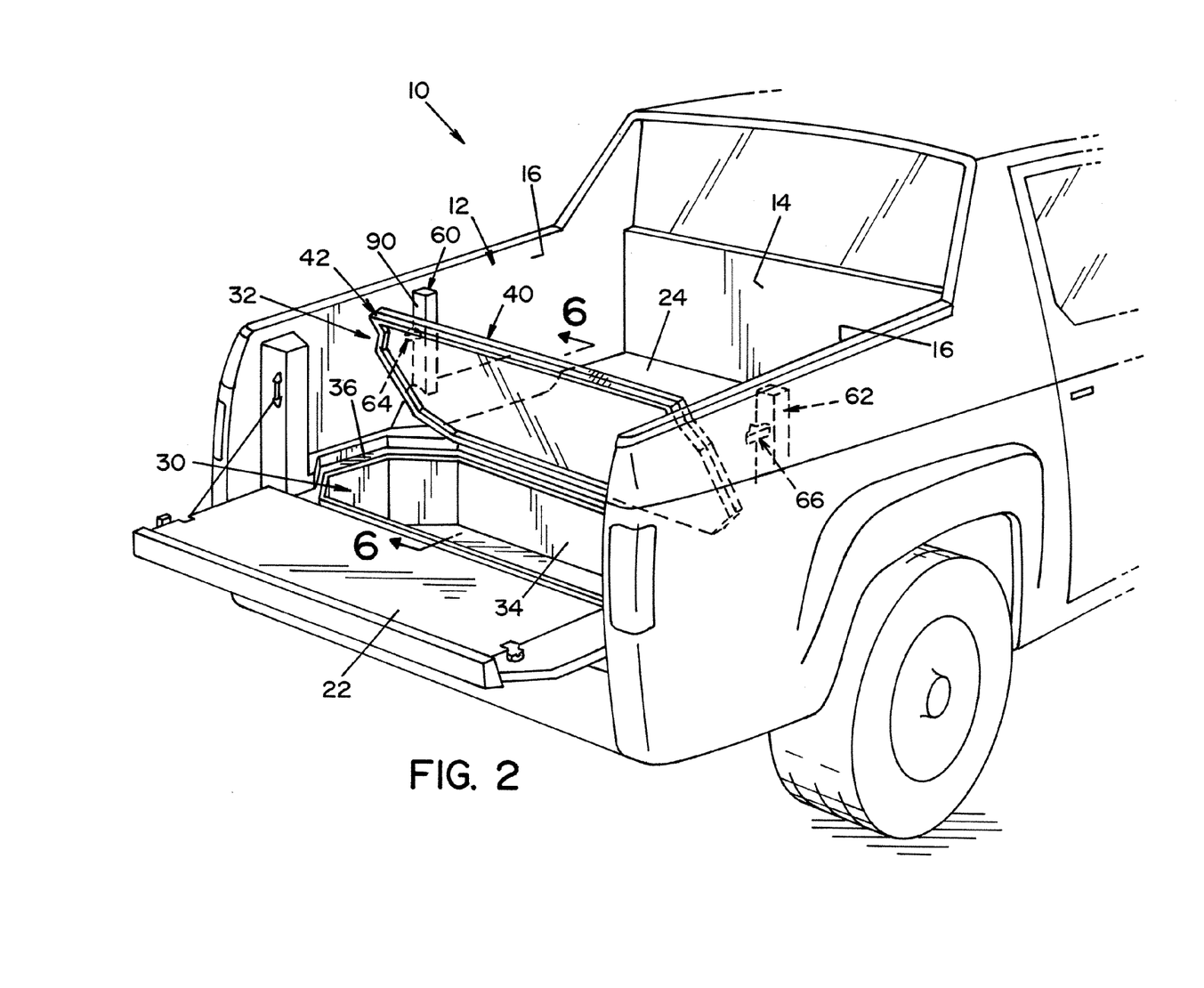
FIG. 2 is a rear perspective view similar to FIG. 1 where the unit that covers the trunk is shown in a second operating position.

With reference to FIG. 2, the vehicle body 10 also includes a trunk 30 that is positioned below the bed floor 24. A unit or closure assembly 32, which will be described with more detail below, cooperates with the side members 16 and 18 to divide the bed 12 and also to cover the trunk 30. When the unit 32 is in the closed position (FIG. 1), the trunk 30 is not readily apparent, and therefore can be referred to as a hidden trunk or a hidden compartment. In the depicted embodiment, the trunk 30 is defined by a shell 34 that is disposed below an underside of the bed floor 24. The shell 34 can connect to the bed floor 24 and is dimensioned so that the trunk 30 can carry cargo that is prone to being stolen or is desirable to be kept from the environmental elements. The bed floor 24 includes a recess 36 that is above the shell 34 and has a complementary periphery to the periphery of the unit 32 that covers the trunk 30. The unit 32 is received in the recess 36 when in the closed position (see FIG. 1).

The unit 32 that selectively covers the trunk 30 and also selectively cooperates with the side members 16 and 18 to divide the bed 12 can include a first movable member 40 and a second movable member 42. Alternatively, the unit 32 can be a single component that both divides the bed 12 and covers the trunk 30. Referring now to the unit that includes two movable members (i.e., the illustrated embodiment), the movable members can move independently from one another, e.g. with respect to one another, and they can also move together as a unit. The first movable member 40, which will also be referred to as a bed divider, can cooperate with the side members 16 and 18 to divide the bed 24 into load carrying regions. The second movable member 42, which will be referred to as a trunk lid, can cover the trunk 30 when the first movable member 40 is cooperating with the side members 16 and 18 to divide the bed 12. The trunk lid 42 and the bed divider 40 are both connected to the bed floor 24. Both the trunk lid 42 and the bed divider 40 are rigid members made from steel, hard plastic or another suitable rigid and durable material. In the depicted embodiment, a hinge 44 connects the unit 32 (the bed divider 40 and the trunk lid 42, or a single piece unit) to the bed floor 24 (see also FIG. 9). The pivoting bed divider 40 and the pivoting trunk lid 42 can pivot about the hinge 44 as a unit to provide access to the trunk 30.

With reference back to FIG. 1 (and also apparent in FIG. 5), the bed divider 40 is movable to a horizontal position where an upper surface of the bed divider 40 is substantially flush with an upper (load bearing) surface of the bed floor 24. The bed divider 40 substantially spans the bed 12 from the left side member 16 to the right side member 18 thus allowing the bed divider 40 to separate the load carrying bed 12 into load carrying regions when in a bed dividing position. This will be described in more detail below. The trunk lid 42 also substantially spans the bed 12 from the left side member 16 to the right side member 18; however, where the trunk 30 has a transverse dimension (transverse to the direction of travel for the vehicle) that is less than the distance between the left side member 16 and the right side member 18, then the trunk lid 42 may have a smaller transverse dimension.

With reference again to FIG. 2, the bed divider 40 and the trunk lid 42 are movable as a unit to provide access to the trunk 30. Since the trunk lid 42 is positioned below the bed divider 40, i.e. the bed divider 40 covers the trunk lid 42 and the trunk 30, when an operator lifts the trunk lid 42 to access the trunk 30, the bed divider 40 is also lifted. In the depicted embodiment, the bed divider 40 latches to the trunk lid 42 to provide a secure attachment between the two components. Latching the bed divider 40 to the trunk lid 42 when the bed divider is in the horizontal position (see FIG. 1) also prevents the bed divider 40 from moving away from the trunk lid 42 when the vehicle goes over bumps, rough roads or the like. This minimizes noise. Latching the bed divider 40 to the trunk lid 42, or vice versa, will be described in more detail below.

Figure 3:
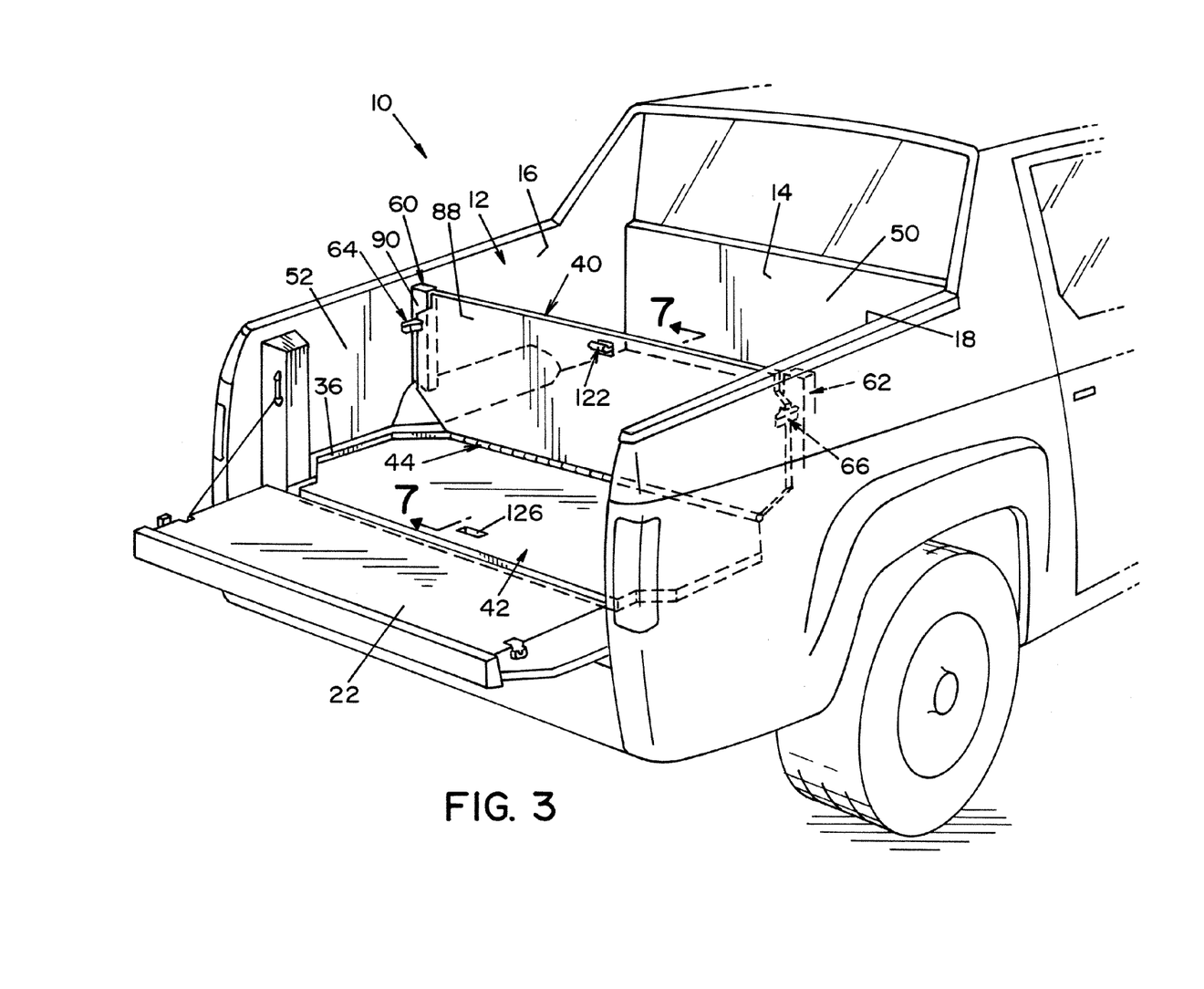
FIG. 3 is a rear perspective view similar to FIG. 1 where the unit that covers the trunk is shown in a third operating position.

With reference to FIG. 3, the bed divider 40 is shown in a locked upright position that divides the load carrying bed 12 into a first load carrying region 50 that is forward the bed divider 40 and a second load carrying region 52 that is rearward the bed divider. When in the locked upright position, the bed divider 40 precludes cargo in the forward load carrying region 50 from moving into the rearward load carrying region 52. Since the bed divider 40 at least substantially spans between the left side member 16 and the right side member 18, the bed divider 40 precludes cargo from moving from the forward load carrying region 50 into the rearward load carrying region 52 around the bed divider 40 between a respective side member 16 or 18 and the now vertical edges of the bed divider. When in the locked upright position, the bed divider 40 can latch to a stop that extends from one of the side members into the load carrying bed 12.

In the depicted embodiment, the vehicle body 10 includes a left side stop 60 that extends from the left side member 16 into the bed 12. The body 10 also includes a right side stop 62 that extends from the right side member 18 into the bed 12. The stops 60 and 62 cooperate with the bed divider 40 to preclude further forward rotational movement of the bed divider 40 when the bed divider is in the locked upright position. In the depicted embodiment, side portions of the bed divider 40 contact a respective stop 60, 62 to preclude further rotational movement of the bed divider 40 from the locked upright position.

In the illustrated embodiment, a left latch mechanism 64 attaches to the left side stop 60 and a right latch mechanism 66 attaches to the right side stop to cooperate with the bed divider 40 to retain the bed divider in the locked upright position. The left latching mechanism 64 and the right latching mechanism 66 are mirror images of one another, therefore only the left latching mechanism 64 will be described in more detail with reference to FIG. 10.

Figure 10:
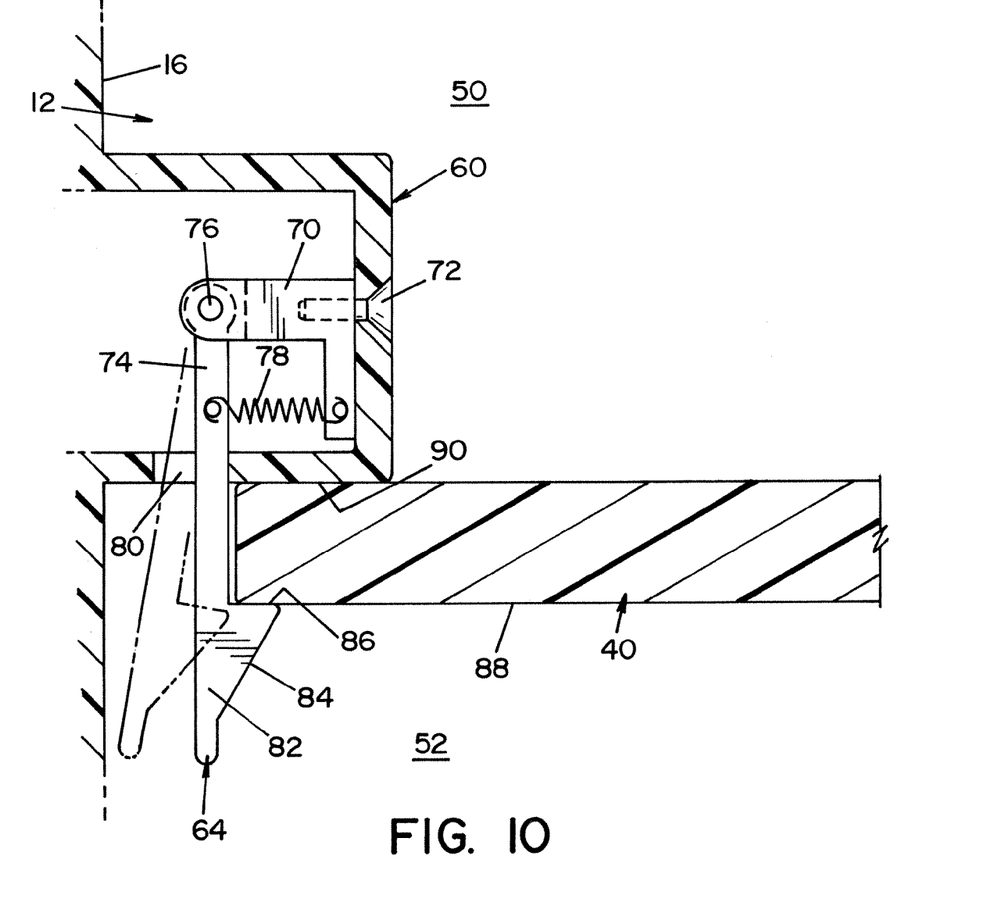
FIG. 10 is a cross-sectional view taken along line 10-10 in FIG. 8.

As seen in FIG. 10, the left latching mechanism 64 includes an L-shaped bracket 70 that attaches to an inner surface of the left side stop 60 using a screw 72. The bracket 70 can attach to the left side stop 60 in other known manners, e.g. a weld. A biased latch arm 74 pivotally attaches to the bracket 70 via a pin 76. The arm 74 is biased towards the bracket 70 and thus towards the interior of the bed 12 by a spring 78. A distal end of the arm 74 extends through an opening 80 in the left side stop 60 and includes a distal protuberance 82 having an inclined surface 84 that transitions into a planar surface 86. The planar surface 86 is generally parallel with a rearward vertical surface 88 of the bed divider 40 when the bed divider is in the vertical locked position. The inclined surface 84 allows the bed divider 40 to displace the arm 74 outwardly as the bed divider 40 is rotated toward the stop 60. When the bed divider contacts the stop 60 the bed divider is no longer contacting the inclined surface 84 such that the arm 74 biases inwardly towards the bed 12 and retains the bed divider 40 against the stop 60. The distance between the planar surface 86 on the leg 74 and a forward contact surface 90 of the side stop 60 is about equal to the thickness of the bed divider 40.

The side stops 60 and 62 can be separate components that attach to the side members 16 and 18. Alternatively, the side members 16 and 18 can be formed to include an inward indentation that operates as a side stop. Accordingly, the bed divider 40 can latch to a side member 16 and 18, which is formed to include an inwardly extending portion that operates as a side stop, or the bed divider can latch to a side stop that is a separate component that is attached to and extends inwardly from the respective side member. The bed divider 40 can be secured to the side stops 60, 62 or some other component that operates similar to a side stop, in other known manners instead of the illustrated latch mechanism (e.g. a dowel cooperating with an opening, a hook, a magnet, a friction fit between the components, etc.).

Additionally, in an alternative embodiment the bed divider 40 may not cooperate with vertically oriented side stops. For example, the bed divider 40 can cooperate with a transverse slot formed in the bed floor. In such an example, the bed divider can rotate in a similar manner as discussed above towards the locked upright position. A lower end of the bed divider can then be received in the transverse slot when in the locked upright position. The lower end of the bed divider and the slot can be each dimensioned so that the bed divider is maintained in the vertical locked position.

Figure 5:
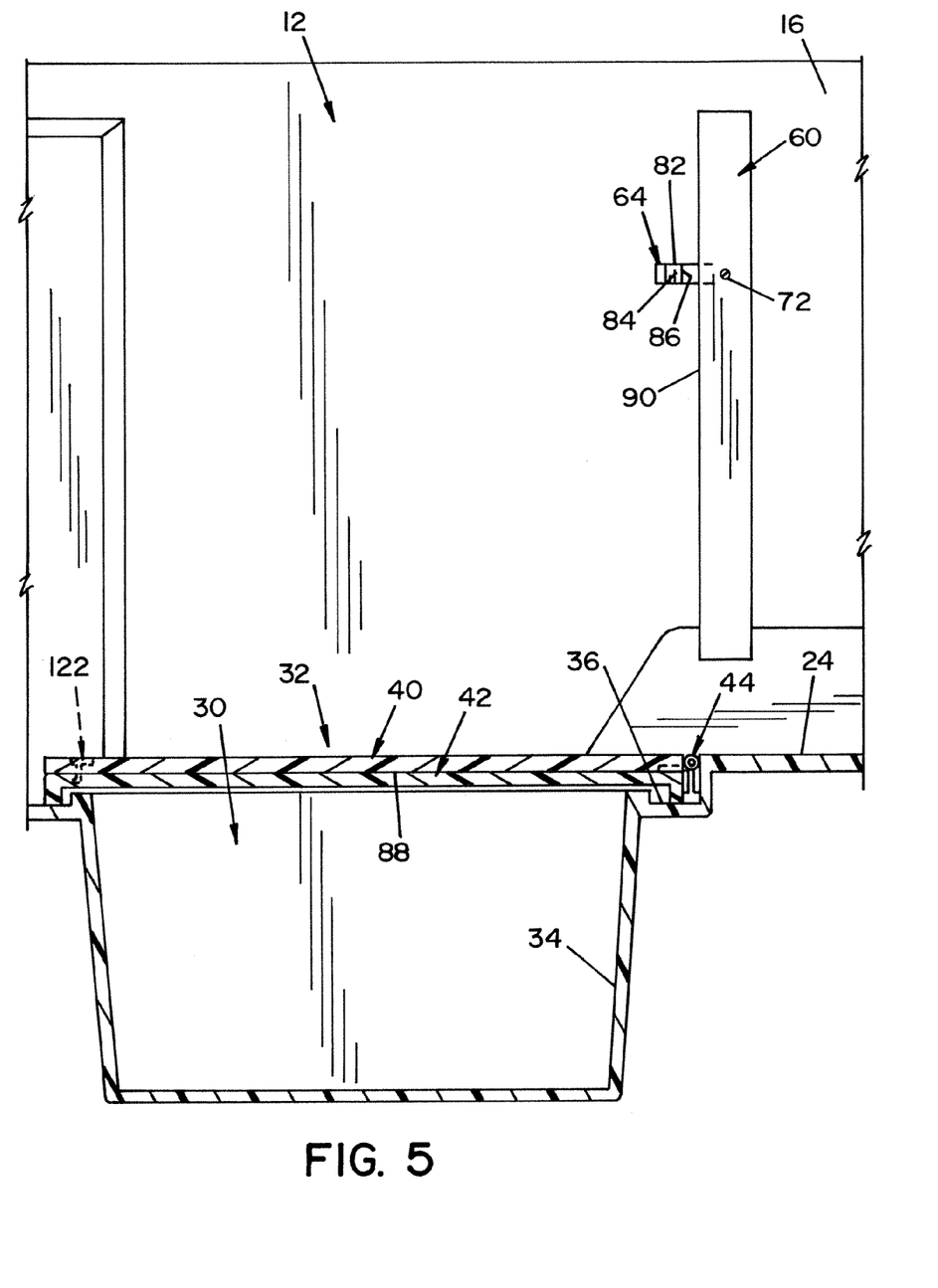
FIG. 5 is a cross-sectional view taken along line 5-5 in FIG. 1.

The unit 32 covering the trunk 30 operates in four operating positions or operation modes. The first operating position is depicted in FIG. 1 and in FIG. 5. In this operation mode, the trunk lid 42 and the bed separator 40 are both closed and received in the recess 36 of the bed floor 24. As such the bed divider 40 covers the trunk lid 42 and the trunk 30. As seen in FIG. 5, while in the first operation mode the bed separator 40 and the trunk lid 42 are generally in a horizontal orientation and the upper surface of the bed divider is substantially flush with the upper surface of the bed floor 24. Accordingly, the depth of the recess 36 is a function of the combined thickness of the bed divider 40 and the trunk lid 42 (or the thickness of the unit 32 where the unit is a single piece). The first operating position allows maximum use of the load carrying bed 12. The bed divider 40 can be latched to the trunk lid 42 in this operation mode, as will be described in more detail below.

Figure 6:
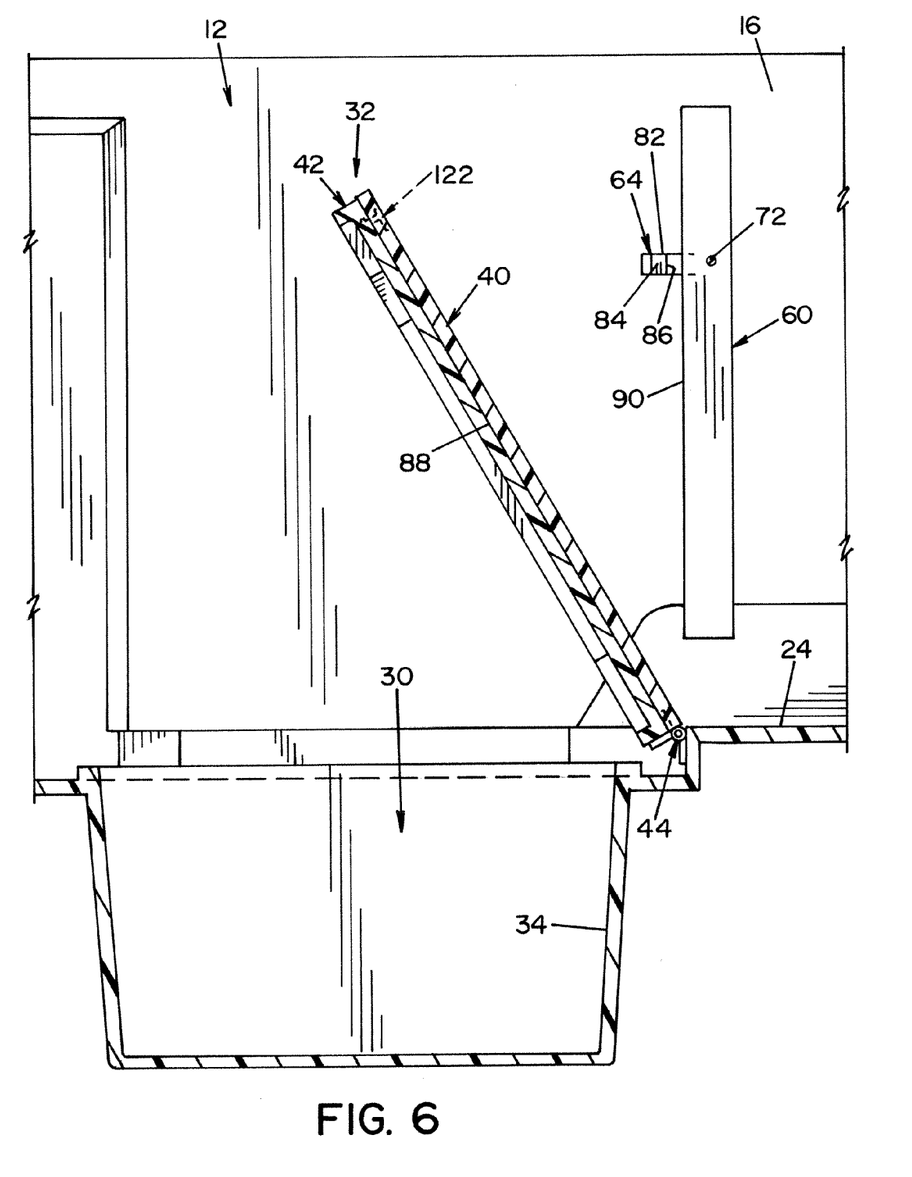
FIG. 6 is a cross-sectional view taken along line 6-6 in FIG. 2.

In the second operation mode, which is depicted in FIGS. 2 and 6, the bed separator 40 and the trunk lid 42 are opened together as a unit. In this operation mode, both the bed separator 40 and the trunk lid 42 are opened to provide access to the trunk. As discussed earlier above, the bed separator 40 can be latched to the trunk lid 42 to facilitate movement as one unit. Alternatively, the bed separator 40 can simply rest upon the trunk lid 42 and an operator lifts the trunk lid 42 which results in movement of the bed divider 40.

Figure 7:
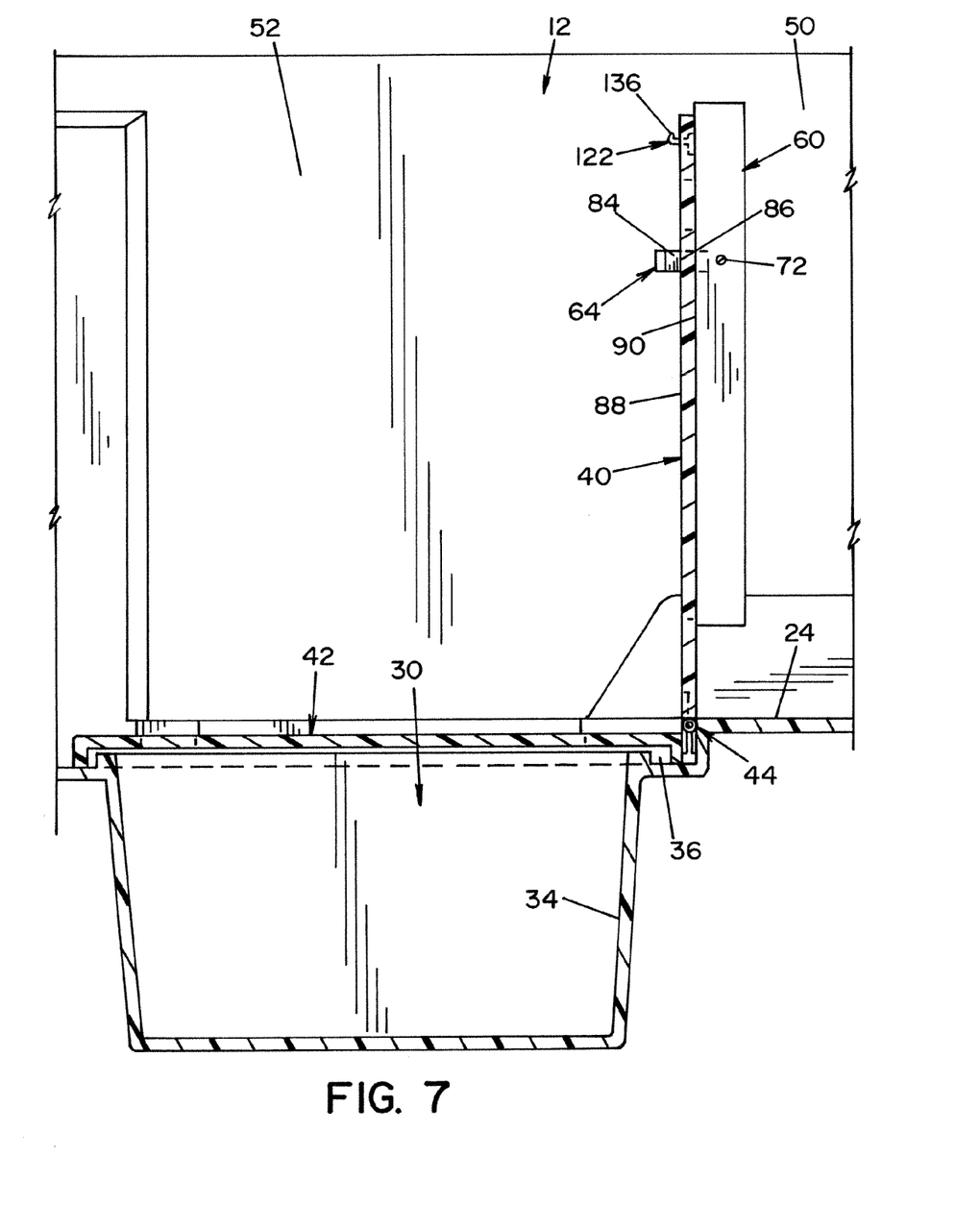
FIG. 7 is a cross-sectional view taken along line 7-7 in FIG. 3.
Figure 8:
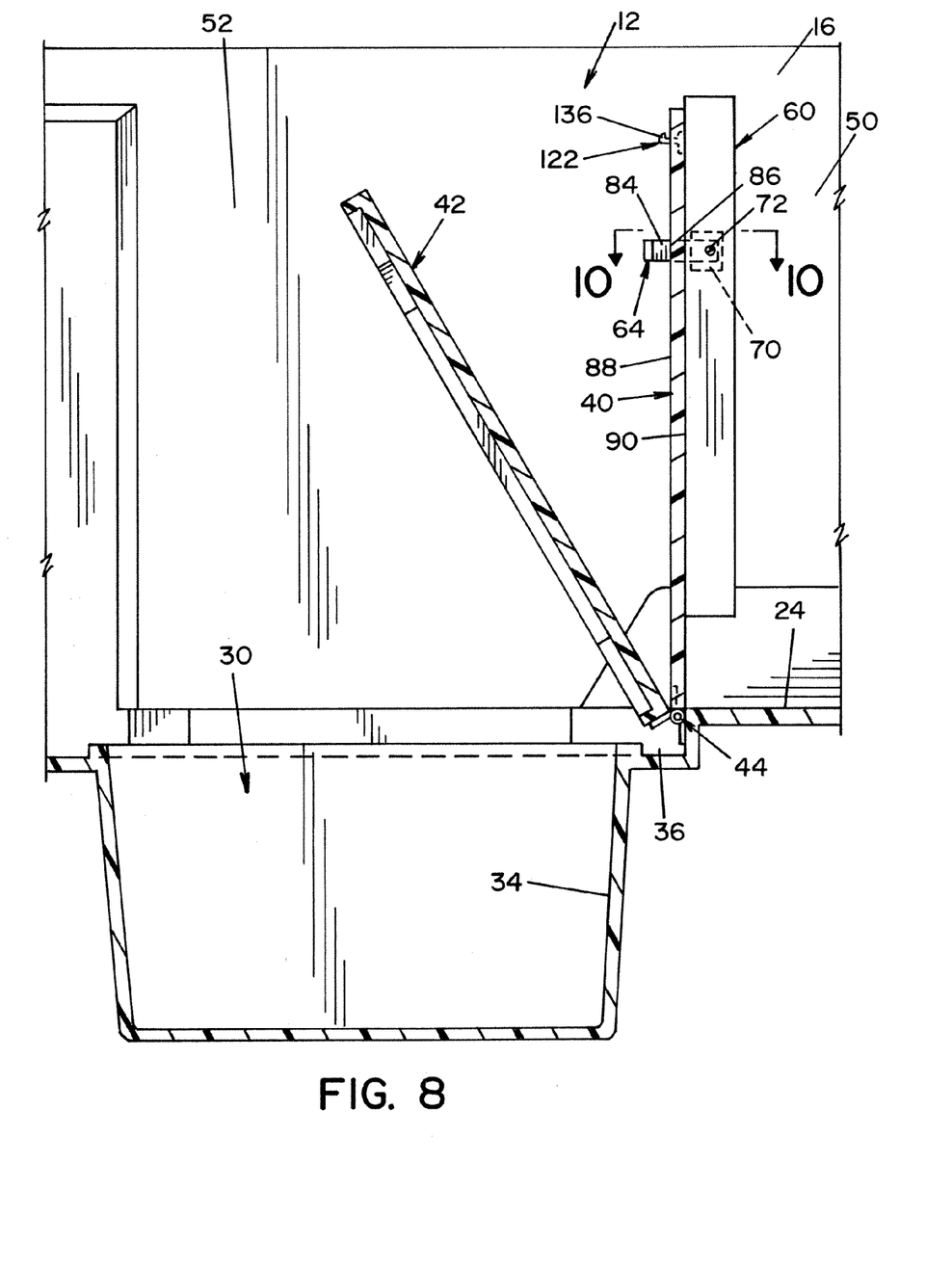
FIG. 8 is a cross-sectional view taken along line 8-8 in FIG. 4.

The third operation mode is depicted in FIGS. 3 and 7. In this operation mode the bed separator 40 is in a locked vertical upright position, also referred to as a bed-dividing position, and the trunk lid 42 remains covering the trunk 30. The trunk lid 42 can latch to the vehicle body 10 and/or bed floor 24 in a similar manner as the bed divider 40 latches to the trunk lid. In the third operation mode, cargo that is stored in the forward cargo carrying region 50 is precluded from moving into the rearward cargo carrying region 52, which would result in the trunk 30 being inaccessible until the cargo is removed from atop the trunk lid 42. In the third operation mode, it can be desirable to place cargo such as gravel, mulch and the like in the forward carrying region 50 while placing shovels and other tools in the rearward carrying region 52 on top of the trunk lid 42. Accordingly, the trunk 30 can be easily accessed by removing the tools from the rear cargo carrying region 52.

Figure 4:
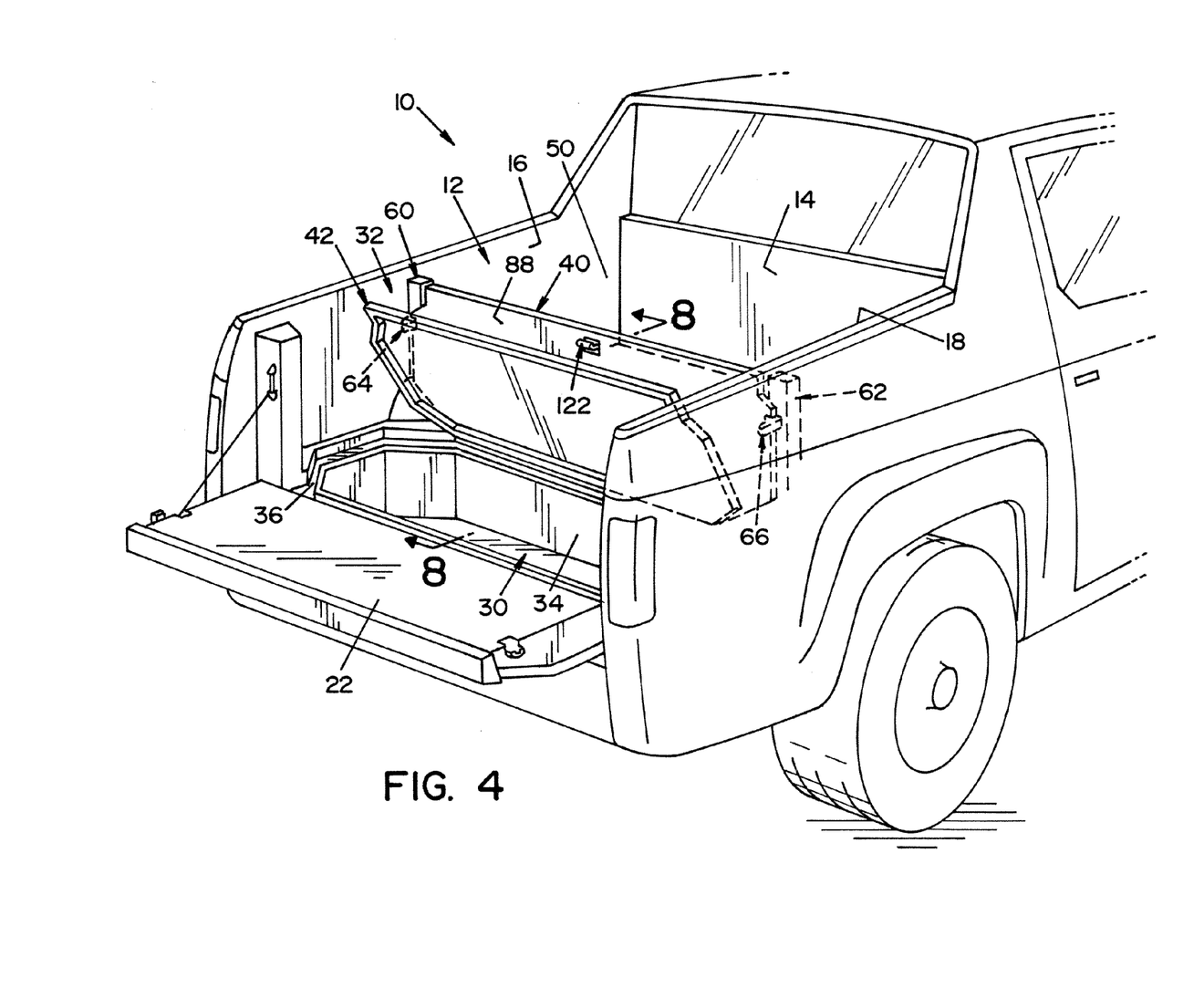
FIG. 4 is a rear perspective view similar to FIG. 1 where the unit that covers the trunk is shown in a fourth operating position.

With reference to FIG. 4, a fourth operation mode is shown where the bed divider 40 is in a locked upright position and the trunk lid 42 is opened to provide access to the trunk.

Figure 9:
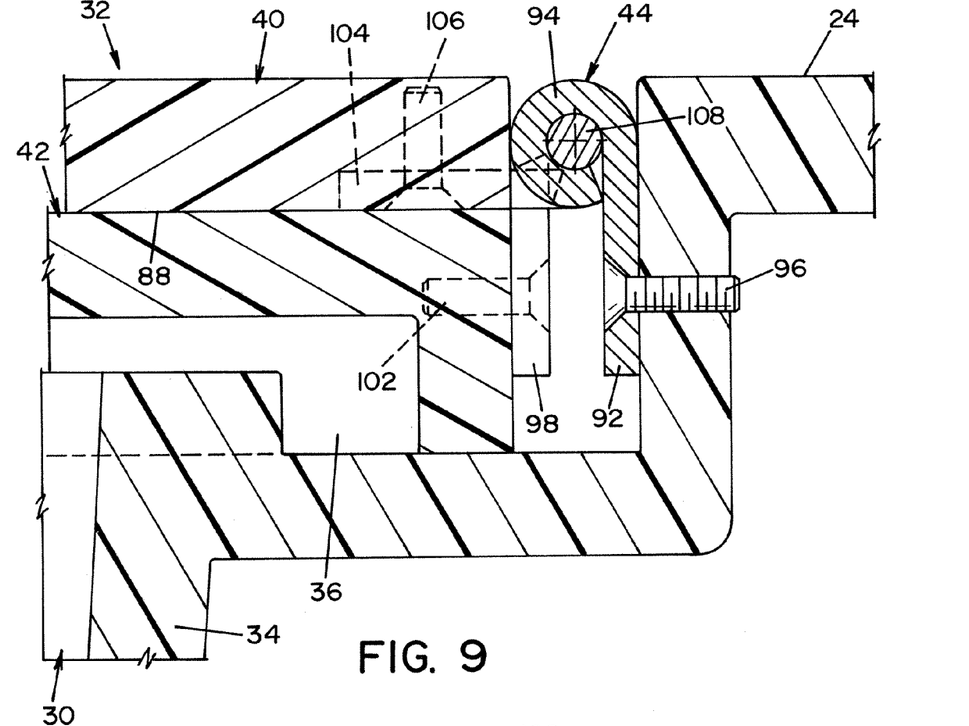
FIG. 9 is a close-up cross-sectional view that depicts how the unit that covers the trunk attaches to a bed floor of the vehicle.

As mentioned above, both the bed divider 40 and the trunk lid 42 are connected to the bed floor 24. In particular, a hinge 44 connects the bed divider 40 and the trunk lid 42 to the bed floor 24. With reference to FIG. 9, in the depicted embodiment a continuous hinge 44 is provided that includes a number of leaves that terminate in knuckles. A first leaf member 92 terminating in a knuckle 94 connects to the bed floor 24 using a fastener 96. A second leaf member 98 having a knuckle (not visible in FIG. 9 but similar to knuckle 94) attaches to the trunk lid 42 using a fastener 102. Similarly, a third leaf member 104 terminating in a knuckle (not visible in FIG. 9 but similar to knuckle 94) attaches to the bed divider 40 using a fastener 106. A pin 108 is received through the respective knuckles to connect the respective leaf members 92, 98 and 104 and to define an axis about which the bed divider 40 and the trunk lid 42 will rotate.

A similar hinge mechanism and alternative mechanisms for fastening the hinge mechanism to the respective components can be provided. The hinge 44 allows the bed divider 40 and the trunk lid 42 to rotate about the same axis, which is a longitudinal axis of the pin 108. Alternatively, two separate hinges could be provided with one hinge connecting one of the bed divider 40 and the trunk lid 42 to the bed floor 24 while the other hinge connects the bed divider to the trunk lid. In such an instance, both the trunk lid 42 and the bed divider 40 would be connected to the bed floor 24, albeit not via a direct connection. Additionally, the bed divider 40 and the trunk lid 42 would not rotate about the same axis.

Figure 11:
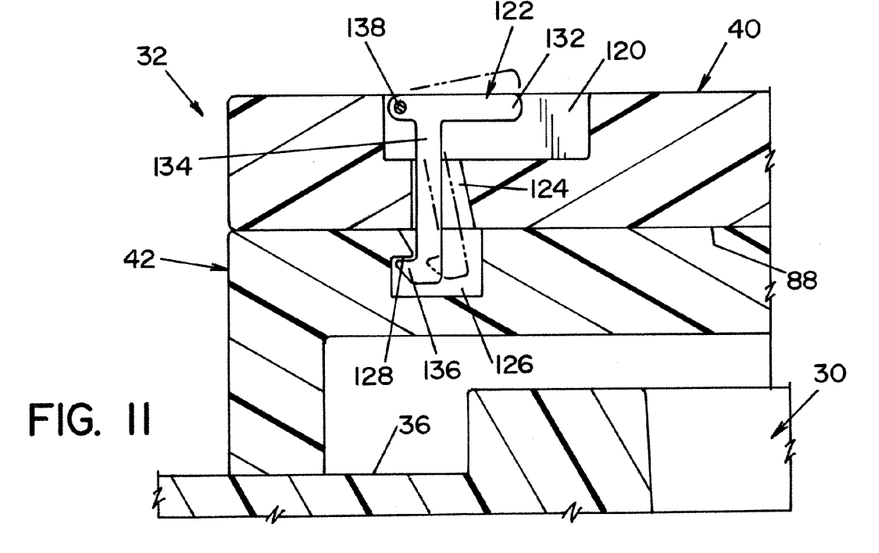
FIG. 11 is a close-up cross-sectional view that depicts a device for attaching two separate members of the unit that covers the trunk.

As mentioned above, the bed divider 40 can latch to the trunk lid 42 to selectively connect one to the other so that they can move as one unit. With reference to FIG. 11, the bed divider 40 includes a recess 120 for receiving a latch 122. The bed divider 40 also includes an opening 124 extending from the recess 120 downward through the bed divider 40. The trunk lid 42 also includes a recess 126. The trunk lid recess 126 is shaped to provide a contact surface 128 that cooperates with the latch 122.

The latch 122 includes a handle portion 132 that can be gripped by the operator. The recess 120 in the bed divider 40 is appropriately shaped to allow a hand of the operator to grasp the handle portion 132 of the latch 122. The latch 122 also includes a downwardly extending arm 134 that extends through the opening 124 in the bed divider 40 and into the recess 126 of the trunk lid 42. The downwardly extending arm 134 terminates at a barb 136 that cooperates with the contact surface 128 on the trunk lid 42 to retain the trunk lid 42 against the bed divider 40, and vice versa. The latch 122 is biased into a closed position (as shown in FIG. 11) and rotates about a pin 138 that connects the latch 122 to the bed divider 40. A torsion spring (not shown) can surround the pin 138 or other biasing member can be used to bias the latch 122 in the closed position. The latch 122 allows the bed divider 40 to selectively latch to and unlatch from the trunk lid 42. When the trunk lid 42 is latched to the bed divider 40, both the bed divider 40 and the trunk lid 42 are movable as a single unit.

It will be appreciated that various of the above-disclosed and other features and functions, or alternatives thereof, may be desirably combined into many other different applications. Also various presently unforeseen or unanticipated alternatives, modifications, variations or improvements therein may be subsequently made by those skilled in the art which are also intended to be encompassed by the following claims.

The invention claimed is:

1. A vehicle body for a vehicle having a load-carrying bed, the body comprising:
   a bed floor defining a load bearing surface of the load-carrying bed;
   a trunk below the bed floor;
   a pivoting trunk lid connected to the bed floor and covering the trunk; and
   a pivoting bed divider connected to the bed floor and covering the trunk lid, the bed divider and the trunk lid being movable as a unit to provide access to the trunk.

2. The body of claim 1, wherein the bed divider pivots between a horizontal position and a locked upright position, when in the locked upright position the bed divider divides the bed into a first load carrying region and a second load carrying region.

3. The body of claim 2, further comprising:
   a left side member extending upwardly from the floor; and
   a right side member extending upwardly from the floor;
   when in the upright position the bed divider being situated in the bed to preclude associated cargo from moving from the first load carrying region into the second load carrying region around a vertical edge of the bed divider between the respective side members and the bed divider.

4. The body of claim 3, further comprising:
a left side stop extending from the left side member into the bed; and
a right side stop extending from the right side member into the bed;
wherein the bed divider latches to at least one of the stops when in the upright position.

5. The body of claim 1, wherein the bed divider latches to the trunk lid.

6. A vehicle body comprising a load-carrying bed defined by left and right side members and a bed floor, the body further including a hidden bed trunk disposed below the bed floor and a unit connected to the bed floor and covering the hidden bed trunk, the unit including a first movable member and a second movable member, the first moveable member pivots between a horizontal position where the first movable member covers the second movable member and an upright position where the first movable member cooperates with the side members to divide the bed.

7. The body of claim 6, further comprising a recess in the bed floor above the hidden bed trunk for receiving the unit, wherein the unit is received in the recess such that an upper surface of the unit is substantially flush with an upper surface of the bed floor.

8. The body of claim 6, wherein an upper surface of the first movable member is flush with an upper surface of the bed floor when in the horizontal position.

9. The body of claim 6, wherein the second movable member pivots between a horizontal position where the second movable member covers the trunk and an open position where the second movable member is moved away providing access to the trunk.

10. The body of claim 9, wherein the first movable member and the second movable member are movable as a single unit.

11. The body of claim 10, wherein the first movable member selectively latches to and unlatches from the second movable member.

12. The body of claim 6 wherein the first movable member and the second movable member rotate about a same axis.

13. The body of claim 6, further comprising:
a left side stop extending into the bed from the left side member; and
a right side stop extending into the bed from the right side member;
wherein at least a portion of the unit latches to at least one of the stops.

14. A vehicle body comprising:
a left side member;
a right side member;
a bed floor extending between the left side member and the right side member, the left side member, the right side member and the bed floor generally defining a load-carrying bed;
a trunk disposed below the bed floor;
a bed divider movable between a closed position where the bed divider covers the trunk and a bed-dividing position where the bed divider divides the bed into at least two cargo carrying regions; and
a trunk lid disposed below the bed divider and movable between a closed position where the trunk lid covers the trunk and an open position where the trunk lid is moved away to provide access to the trunk, wherein the trunk lid latches to the bed divider.

15. The vehicle body of claim 14, wherein the bed divider includes a portion that at least substantially extends from the left side member to the right side member.

16. The vehicle body of claim 14, wherein the bed floor defines a recess above the trunk and an upper surface of the bed divider is substantially flush with an upper surface of the bed floor when the bed divider and the trunk lid are received in the recess.

17. A vehicle body comprising:
a bed floor;
a trunk below the bed floor;
a pivoting trunk lid connected to the bed floor and selectively covering the trunk; and
a pivoting bed divider connected to the bed floor and selectively covering the trunk lid, the bed divider and the trunk lid being pivotable about a same axis.

18. The vehicle body of claim 15, wherein the bed divider selectively connects to at least one of the side members or to a component extending inwardly from at least one of the side members.

19. The vehicle body of claim 15, wherein the bed divider and the trunk lid pivot about a same axis.

20. The vehicle body of claim 17, wherein the trunk lid latches to the bed divider.

21. The vehicle body of claim 17, wherein the bed divider and the trunk lid are movable as a unit to provide access to the trunk.

* * * * *